United States Patent
Takenaka et al.

(10) Patent No.: US 10,978,983 B2
(45) Date of Patent: Apr. 13, 2021

(54) ROTARY ELECTRIC MACHINE CONTROL DEVICE

(71) Applicant: AISIN AW CO., LTD., Anjo (JP)

(72) Inventors: Masayuki Takenaka, Nishio (JP); Takuro Iwase, Anjo (JP); Akiya Kume, Anjo (JP); Shoji Nagata, Anjo (JP); Yasuyuki Sato, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 63 days.

(21) Appl. No.: 16/473,914

(22) PCT Filed: Mar. 27, 2018

(86) PCT No.: PCT/JP2018/012463
§ 371 (c)(1),
(2) Date: Jun. 26, 2019

(87) PCT Pub. No.: WO2018/181332
PCT Pub. Date: Oct. 4, 2018

(65) Prior Publication Data
US 2020/0295696 A1    Sep. 17, 2020

(30) Foreign Application Priority Data

Mar. 29, 2017  (JP) .............................. JP2017-064366

(51) Int. Cl.
*H02P 27/08* (2006.01)
*H02M 7/5395* (2006.01)
*H02P 25/022* (2016.01)

(52) U.S. Cl.
CPC .......... *H02P 27/08* (2013.01); *H02M 7/5395* (2013.01); *H02P 25/022* (2013.01)

(58) Field of Classification Search
USPC ........................................................ 316/560
See application file for complete search history.

(56) References Cited

U.S. PATENT DOCUMENTS 2,574,458 A * 11/1951 Atkinson ............ H02J 13/0089
307/31
4,691,269 A * 9/1987 Yamane .............. H02M 7/5395
363/132
(Continued)

FOREIGN PATENT DOCUMENTS

| JP | 2011-188543 A | 9/2011 |
| JP | 2015-53824 A | 3/2015 |
| WO | 2011/096051 A1 | 8/2011 |

OTHER PUBLICATIONS

Hara et al., "Study on Vibration Generation Mechanism of Distributed Winding Permanent Magnet Synchronous Motor for PWM method of Voltage Source Inverters" IEE Japan, pp. 319-324, 2016.
(Continued)

*Primary Examiner* — Bentsu Ro
(74) *Attorney, Agent, or Firm* — Oliff PLC

(57) ABSTRACT

A rotary electric machine control device that performs drive control on an AC rotary electric machine using an inverter that converts power between DC power and AC power through pulse width modulation based on a carrier frequency, the rotary electric machine control device including: an electronic control unit that is configured to vary the carrier frequency such that the carrier frequency becomes higher as a rotational speed of the rotary electric machine becomes higher so that carrier sideband frequencies, which are frequencies of sideband waves that appear on higher and lower sides of a center frequency that is set in accordance with the carrier frequency, are not included in a frequency band prescribed in advance.

20 Claims, 3 Drawing Sheets

(56) References Cited

U.S. PATENT DOCUMENTS

| | | | | |
|---|---|---|---|---|
| 4,989,128 | A | * | 1/1991 | Ohyama ........... H02M 7/53873 363/132 |
| 5,376,872 | A | * | 12/1994 | Hara ................... H02M 7/5395 318/799 |
| 2004/0207360 | A1 | * | 10/2004 | Matsushiro ........ B60H 1/00428 318/811 |
| 2007/0052382 | A1 | * | 3/2007 | Nomura .................... H02P 6/34 318/400.08 |
| 2012/0286716 | A1 | | 11/2012 | Ohsugi |
| 2015/0229255 | A1 | | 8/2015 | Wang et al. |
| 2019/0089285 | A1 | * | 3/2019 | Otsuka ................. H02P 27/045 |
| 2019/0366854 | A1 | * | 12/2019 | Sun ........................ B60L 15/02 |

OTHER PUBLICATIONS

Jun. 19, 2018 International Search Report issued in International Patent Application No. PCT/JP2018/012463.

* cited by examiner

ROTARY ELECTRIC MACHINE CONTROL DEVICE

BACKGROUND

The present disclosure relates a rotary electric machine control device that performs drive control on an AC rotary electric machine using an inverter that converts power between DC power and AC power through pulse width modulation.

Pulse width modulation is often performed to drive an AC rotary electric machine using an inverter. In the pulse width modulation, a voltage command in a sinusoidal waveform (including a distorted waveform for improving the conversion efficiency) is converted into a pulse signal in a square waveform through magnitude comparison with a carrier in a triangular waveform (including a sawtooth shape) that serves as a threshold. The pulse signal is finer if the frequency of the carrier is higher, and coarser if the frequency of the carrier is lower. In the case where a rotary electric machine (e.g. a permanent magnet synchronous motor (PMSM)) is driven using pulse width modulation, as pointed out in Takefumi Hara et al. "Study on Vibration Mechanism of Distributed Winding Permanent Magnet Synchronous Motor for PWM Method of Voltage Source Inverters", 2017 IEE Japan Industry Applications Society Conference, IEE Japan, 2016, 3-59 [III-319], resonance may be caused to generate noise in the audible range in the case where the frequency of an electromagnetic excitation force generated because of the frequency of the carrier and the frequency of natural vibration of a mechanical element match each other. Such noise in the audible noise has sideband waves that have frequencies that are higher and lower than a center frequency that is set in accordance with the frequency of the carrier. The frequencies of the sideband waves are varied toward the higher and lower sides away from the center frequency as the rotational speed of the rotary electric machine is raised.

It is known that the audible range includes a frequency band called an uncomfortable audible frequency band that makes humans feel very uncomfortable. If the frequency of noise in the audible range is included in the uncomfortable audible frequency band, such noise in the audible range is uncomfortable for humans. For example, in the case where the uncomfortable audible frequency band is lower than the center frequency that is set in accordance with the frequency of the carrier, the frequency of one of the sideband waves on the lower side with respect to the center frequency may be included in the uncomfortable audible frequency band. As a countermeasure, it is conceivable to increase the center frequency such that the frequency of the sideband wave becomes higher than the upper-limit frequency of the uncomfortable audible frequency band. The center frequency can be increased by increasing the frequency of the carrier. However, increasing the frequency of the carrier makes a pulse signal generated through modulation finer (makes the frequency of the pulse signal higher), which may incur an increase in switching loss of the inverter.

SUMMARY

In view of the foregoing background, it is desirable to reduce noise in the audible range generated in a rotary electric machine in accordance with the carrier frequency for pulse width modulation while suppressing a reduction in total electric efficiency of an inverter and the rotary electric machine when controlling the rotary electric machine through pulse width modulation.

In view of the foregoing, a rotary electric machine control device that performs drive control on an AC rotary electric machine using an inverter that converts power between DC power and AC power through pulse width modulation based on a carrier frequency includes an electronic control unit that is configured to vary the carrier frequency such that the carrier frequency becomes higher as a rotational speed of the rotary electric machine becomes higher so that carrier sideband frequencies, which are frequencies of sideband waves that appear on higher and lower sides of a center frequency that is set in accordance with the carrier frequency, are not included in a frequency band prescribed in advance.

The carrier sideband frequencies are fluctuated in accordance with the rotational speed of the rotary electric machine. Therefore, the carrier sideband frequencies may be included in a frequency band prescribed in advance, e.g. a frequency band for noise in the audible range, depending on the relationship with the rotational speed of the rotary electric machine. However, the carrier sideband frequencies can be determined so as not to be included in such a frequency band by varying the carrier frequency in accordance with the rotational speed of the rotary electric machine. As a different method, it is also possible to fix the carrier frequency at a frequency at which the carrier sideband frequencies are not included in such a frequency band over the entire rotational speed range in which the rotary electric machine is used. In this case, however, the switching loss of the inverter may be increased to lower the total electric efficiency of the inverter and the rotary electric machine, since a high carrier frequency is required also in the case where the rotational speed of the rotary electric machine is low. By varying the carrier frequency so as to become higher as the rotational speed of the rotary electric machine becomes higher as in the present configuration, however, it is possible to suppress a reduction in total electric efficiency of the inverter and the rotary electric machine. That is, with the present configuration, it is possible to reduce noise in the audible range generated in the rotary electric machine in accordance with the carrier frequency for pulse width modulation while suppressing a reduction in total electric efficiency of the inverter and the rotary electric machine when controlling the rotary electric machine through pulse width modulation.

Further characteristics and advantages of the rotary electric machine control device will become clear from the following description of an embodiment made with reference to the drawings.

DETAILED DESCRIPTION OF EMBODIMENTS

Figure 1:
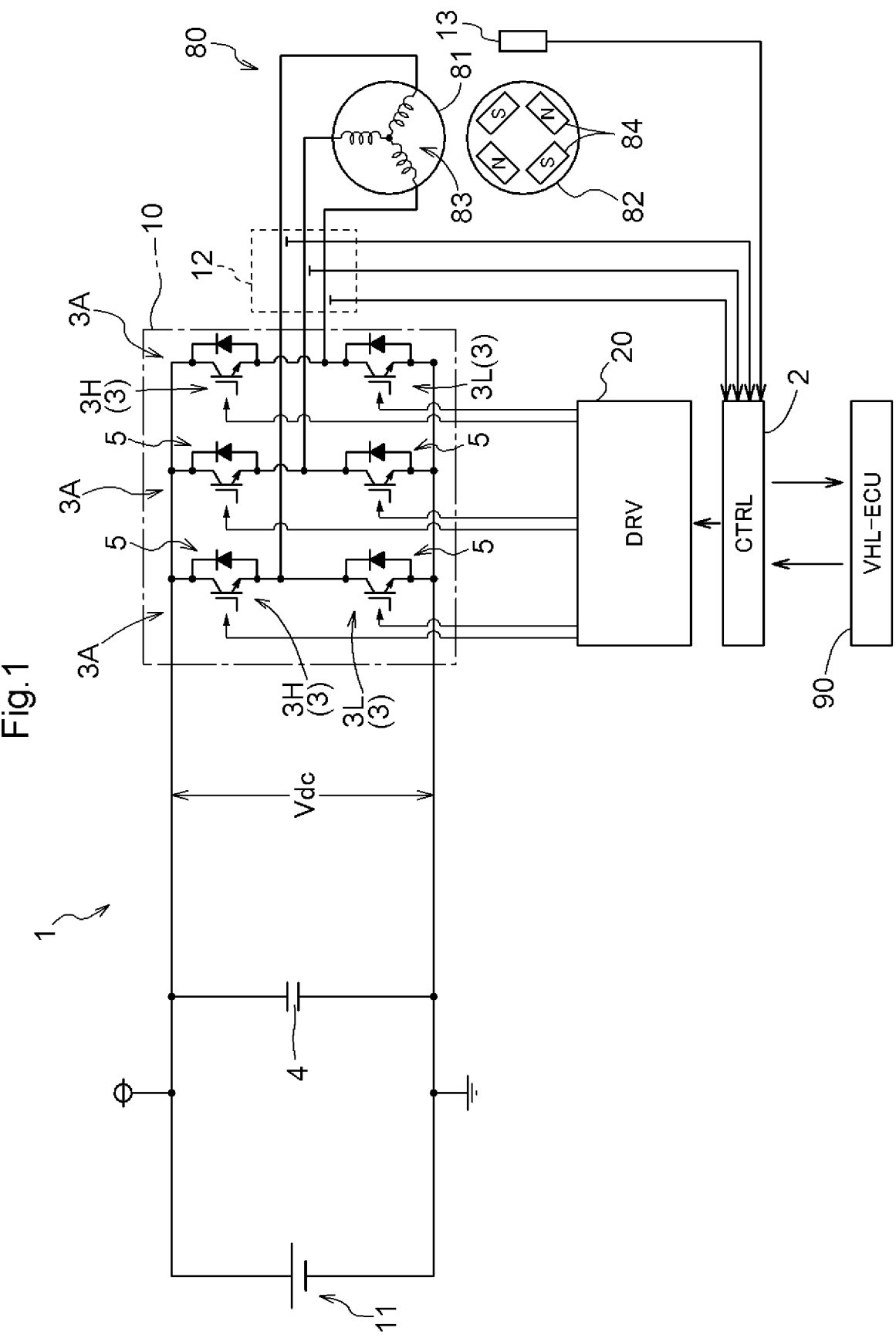
FIG. 1 is a block diagram schematically illustrating the configuration of a rotary electric machine control device.

A rotary electric machine control device that performs drive control on a rotary electric machine that serves as a drive force source for a vehicle will be described below by way of example. The circuit block diagram in FIG. 1 schematically illustrates the system configuration of a rotary electric machine drive device 1 including a rotary electric machine control device 2 (CTRL). A rotary electric machine 80 to be driven in the present embodiment is a permanent magnet rotary electric machine (PMSM: Permanent Magnet Synchronous Motor) that has a stator 81 including stator coils 83, and a rotor 82 including permanent magnets 84. FIG. 1 illustrates an aspect in which the rotor 82 has four poles (two pairs of poles) with four magnetic poles (two N poles and two S poles) by way of example. However, the number of magnetic poles (number of pole pairs pp) in the rotor 82 and the arrangement of the permanent magnets 84 are illustrative, and do not limit the present disclosure. While the rotary electric machine to be driven by the rotary electric machine drive device 1 is a permanent magnet rotary electric machine in the aspect described herein by way of example, the rotary electric machine to be driven may be a rotary electric machine with no permanent magnets, such as an induction rotary electric machine. The rotary electric machine 80 can function as both an electric motor and an electric generator. As illustrated in FIG. 1, the rotary electric machine drive device 1 includes an inverter 10 that converts power between DC power and multi-phase AC power.

The rotary electric machine 80 is a drive force source for wheels of a hybrid vehicle, an electric vehicle, etc., for example. In the present embodiment, the rotary electric machine 80 is preferably a drive force source for an electric vehicle. The rotary electric machine control device 2 according to the present embodiment is characteristically configured to reduce noise in the audible range (hereinafter occasionally referred to, as appropriate, as an "audible sound") generated in the rotary electric machine 80 in accordance with a carrier frequency fc for pulse width modulation while suppressing a reduction in total electric efficiency of the inverter 10 and the rotary electric machine 80 when controlling the rotary electric machine 80 through pulse width modulation. The audible sound differs among individuals since sounds that one can actually hear and sounds that one feels uncomfortable differ depending on the hearing ability, age, etc. The audible sound herein is prescribed generally in accordance with the frequency band etc. on the basis of human engineering or the like, for example, rather than in accordance with individual preferences.

As is well known, the hybrid vehicle has an internal combustion engine (not illustrated) and the rotary electric machine 80 as drive force sources for the wheels. Therefore, in the hybrid vehicles, when the internal combustion engine is started, the operating sound of the internal combustion engine occasionally conceals noise in the audible range (audible sound) generated in the rotary electric machine 80, so that the noise is not easily recognizable by a user (passenger). In the electric vehicles, on the other hand, there are few mechanisms, such as an internal combustion engine, that generate an operating sound that conceals the audible sound generated by the rotary electric machine 80, and therefore the audible sound generated by the rotary electric machine 80 tends to be striking compared to the hybrid vehicles. Therefore, the rotary electric machine control device 2 according to the present embodiment is particularly effective when applied to the electric vehicles.

The inverter 10 is connected to the AC rotary electric machine 80 and a high-voltage battery 11 (DC power source) to convert power between multi-phase AC power and DC power. The high-voltage battery 11 is constituted of a rechargeable secondary battery (battery), such as a nickel-hydrogen battery or a lithium-ion battery, an electric double layer capacitor, or the like, for example. In the case where the rotary electric machine 80 is a drive force source for the vehicle, the high-voltage battery 11 is a high-voltage high-capacity DC power source, and has a rated power source voltage of 200 to 400 [V], for example. A smoothing capacitor (DC link capacitor 4) that smoothes the voltage (DC link voltage Vdc) across the positive electrode and the negative electrode is provided on the DC side of the inverter 10.

The inverter 10 is configured to have a plurality of switching elements 3. The switching elements 3 are preferably power semiconductor elements that can operate at a high frequency, such as IGBTs (Insulated Gate Bipolar Transistors), power MOSFETs (Metal Oxide Semiconductor Field Effect Transistors), SiC-MOSFETs (Silicon Carbide-Metal Oxide Semiconductor FETs), SiC-SITs (SiC-Static Induction Transistors), and GaN-MOSFETs (Gallium Nitride-MOSFETs). In the present embodiment, as illustrated in FIG. 1, IGBTs are used as the switching elements 3.

The inverter 10 is constituted of a bridge circuit that includes a plurality of (here, three) arms 3A, each of which corresponds to one phase of AC power and is constituted of a series circuit including an upper switching element 3H and a lower switching element 3L. In the case of the rotary electric machine 80 for three phases, a bridge circuit is constituted. Sets of series circuits (arms 3A) in the bridge circuit correspond to the respective stator coils 83 corresponding to U-phase, V-phase, and W-phase. The middle point between the each arm 3A, that is, the point of connection between the switching element 3 on the positive electrode side (upper switching element 3H) and the switching element 3 on the negative electrode side (lower switching element 3L), is connected to a corresponding one of the stator coils 83 of the rotary electric machine 80 for three phases. A freewheeling diode 5 is provided in parallel with each of the switching elements 3 with the direction from the negative pole toward the positive pole (the direction from the lower side toward the upper side) defined as the forward direction.

As illustrated in FIG. 1, the inverter 10 is controlled by the rotary electric machine control device 2. The rotary electric machine control device 2 is constructed of a logic circuit, such as a microcomputer, as a core member. For example, the rotary electric machine control device 2 controls the rotary electric machine 80 via the inverter 10 by performing current feedback control using a vector control method on the basis of target torque for the rotary electric machine 80 provided as a request signal from a different control device or the like such as a vehicle ECU (Electronic Control Unit) 90 (VHL-ECU) which is one of higher-order control devices in the vehicle.

Actual currents that flow through the stator coils 83 of the rotary electric machine 80 for the respective phases are detected by a current sensor 12, and the rotary electric machine control device 2 acquires the detection result. In addition, the magnetic pole position of the rotor 82 of the rotary electric machine 80 at each time point and a rotational speed ω of the rotor 82 are detected by a rotation sensor 13, such as a resolver, for example, and the rotary electric machine control device 2 acquires the detection result. The rotary electric machine control device 2 executes current feedback control using the detection result of the current sensor 12 and the rotation sensor 13. The rotary electric machine control device 2 is configured to have a variety of functional sections for the current feedback control, which are each implemented through cooperation between hardware such as a microcomputer and software (program). The current feedback control is known, and thus is not described in detail herein.

Control terminals of the switching elements 3 (e.g. gate terminals of the IGBTs) which constitute the inverter 10 are connected to the rotary electric machine control device 2 via a drive device 20 (DRV), which serves as an inverter drive device, to be individually subjected to switching control. The vehicle ECU 90 and the rotary electric machine control device 2 which generates a switching control signal are constituted of a microcomputer or the like as a core component, and have an operating voltage of 5 [V] or 3.3 [V], for example. The vehicle includes not only the high-voltage battery 11 but also a low-voltage battery (not illustrated) that serves as a power source at a low voltage (e.g. 12 to 24 [V]) compared to the high-voltage battery 11. The rotary electric machine control device 2 is supplied with power from the low-voltage battery via a power circuit (not illustrated) such as a regulation circuit.

As described above, the inverter 10 and the rotary electric machine control device 2 have operating voltages that are significantly different from each other. Therefore, the rotary electric machine drive device 1 is provided with the drive device 20 which relays a switching control signal SW (a gate drive signal in the case of the IGBTs) for each of the switching elements 3 with the drive capability (e.g. the capability to cause the following circuit to operate, such as the voltage amplitude and the output current) of the switching control signal SW enhanced. The switching control signal which is generated by the rotary electric machine control device 2 is supplied to the inverter 10 via the drive device 20.

Figure 2:
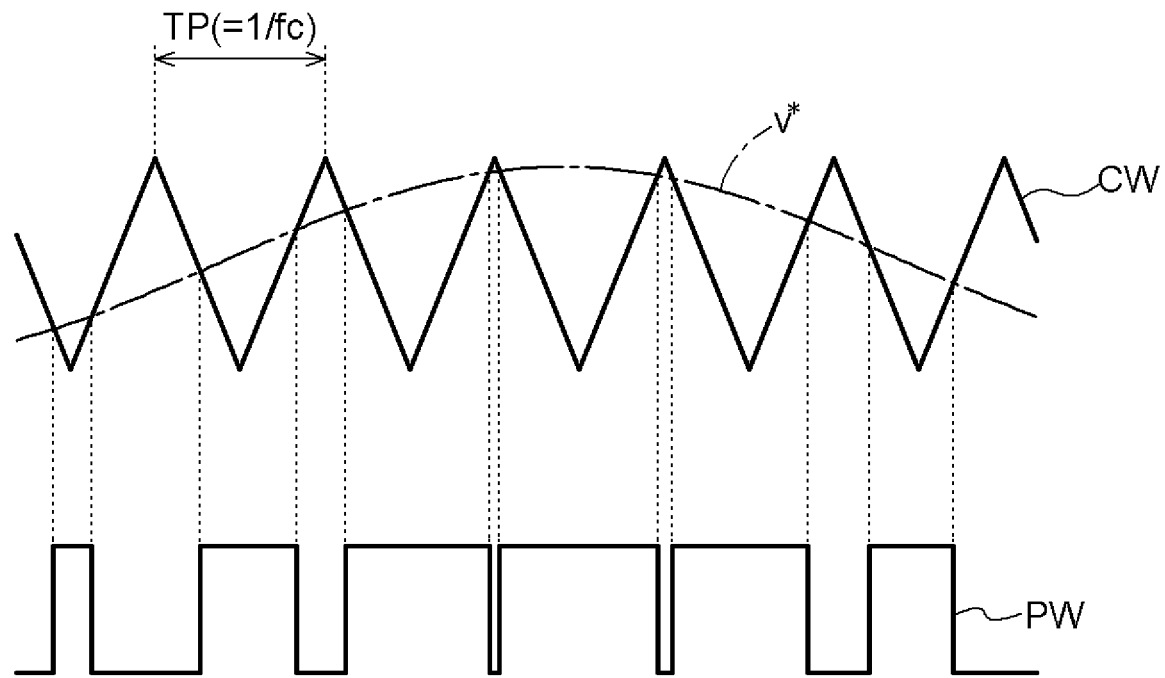
FIG. 2 illustrates the principle of pulse width modulation.

The rotary electric machine control device 2 performs drive control on the rotary electric machine 80 by performing switching control on the inverter 10 through pulse width modulation based on the carrier frequency fc. FIG. 2 illustrates the principle of pulse width modulation for a voltage command v* for one phase. As illustrated in FIG. 2, the voltage command v* is converted into a pulse signal PW (modulated pulse) through comparison between the voltage command v* and a carrier CW for pulse width modulation. The reciprocal of a period TP of the carrier CW is the carrier frequency fc. As is clear from FIG. 2, as the carrier frequency fc is higher (the period TP of the carrier CW is shorter), more pulse signals PW are generated in one period of the voltage command v*.

Figure 4:
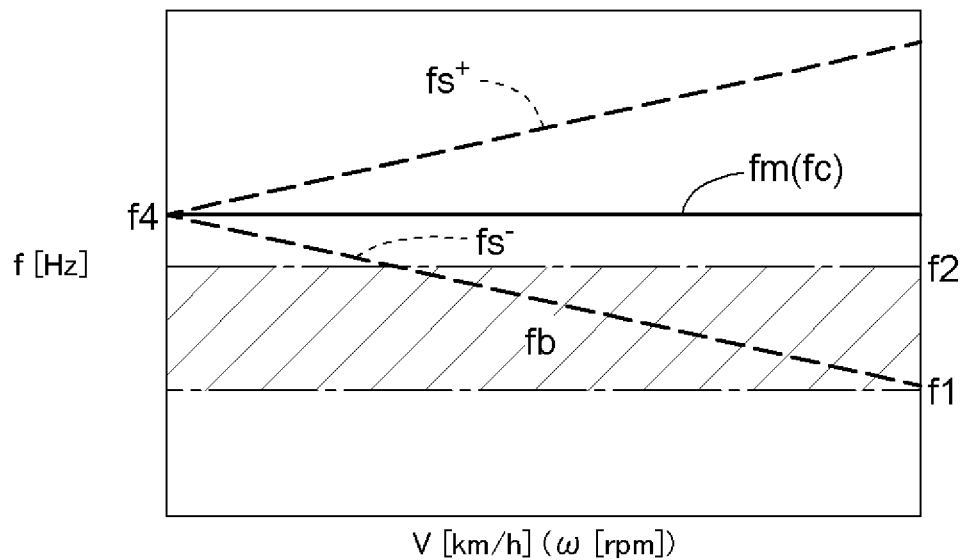
FIG. 4 is a graph illustrating, as a comparative example, the relationship between noise in the audible range and the uncomfortable audible frequency band for a case where the carrier frequency is constant.

In the case where a permanent magnet rotary electric machine is driven using pulse width modulation, resonance may be caused to generate noise in the audible range (audible sound) in the case where the frequency of an electromagnetic excitation force generated because of the carrier frequency fc and the frequency of natural vibration of a mechanical element match each other. FIG. 4 is a graph illustrating an example of such noise in the audible range for a case where the carrier frequency fc is constant. By way of example, such noise in the audible noise often has sideband waves that have frequencies (carrier sideband frequencies ($fs^+$, $fs^-$)) that are higher and lower than a center frequency fm that is set in accordance with the carrier frequency fc. The frequencies (carrier sideband frequencies ($fs^+$, $fs^-$)) of the sideband waves are varied toward the higher and lower sides away from the center frequency fm as the rotational speed ω of the rotary electric machine 80 is raised.

Figure 5:
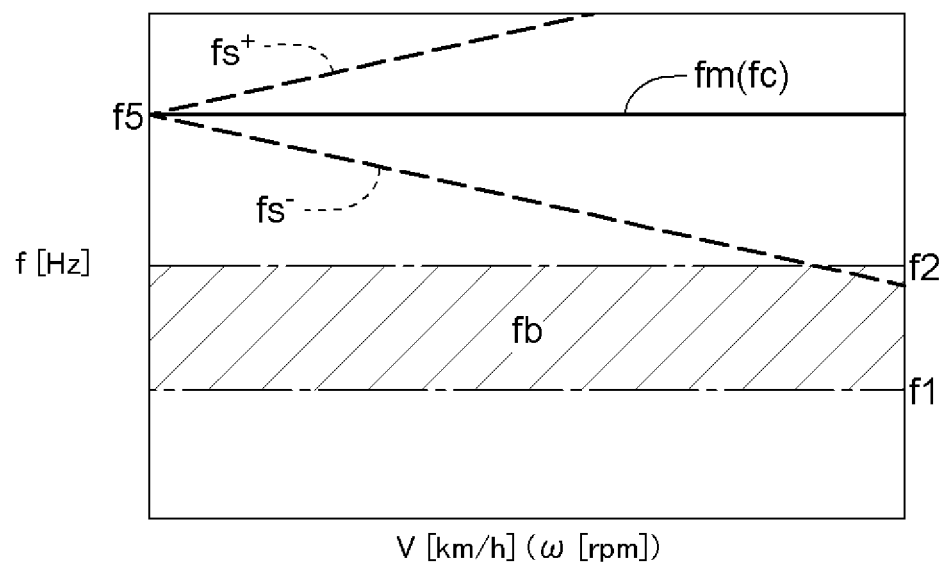
FIG. 5 is a graph illustrating, as a comparative example, the relationship between noise in the audible range and the uncomfortable audible frequency band for a case where the carrier frequency is offset toward the higher side.

It is known that the audible range includes a frequency band (e.g. 2.5 k to 5 k [Hz]) called an uncomfortable audible frequency band fb that makes humans feel very uncomfortable. If the frequency of noise in the audible range (audible sound) is included in the uncomfortable audible frequency band fb as indicated in FIG. 4, such noise in the audible range is uncomfortable for humans. In the case where the uncomfortable audible frequency band fb is lower than the center frequency fm which is set in accordance with the carrier frequency fc as indicated in FIG. 4, the carrier sideband frequency ($fs^-$) on the lower side with respect to the center frequency fm may be included in the uncomfortable audible frequency band fb. As a countermeasure, it is conceivable to increase the center frequency fm such that the carrier sideband frequency ($fs^-$) becomes higher than an upper-limit frequency f2 of the uncomfortable audible frequency band fb. FIG. 5 illustrates an example in which the center frequency fm is increased. The value "f5" of the center frequency fm in FIG. 5 is higher than the value "f4" of the center frequency fm in FIG. 4. In FIG. 5, the carrier sideband frequency ($fs^-$) on the lower side with respect to the center frequency fm does not reach the uncomfortable audible frequency band fb before the rotational speed ω of the rotary electric machine 80 becomes higher than that in FIG. 4.

In the case where the rotary electric machine 80 is a drive force source for a vehicle, a travel speed V of the vehicle is also high when the rotational speed ω of the rotary electric machine 80 is high. In the case where the travel speed V of the vehicle is high, audible noise (e.g. road noise) caused by travel is also generated, and therefore noise in the audible range (audible sound) due to the rotary electric machine 80 is less striking. Thus, the effect of an audible sound generated by the rotary electric machine 80 can be reduced by shifting the center frequency fm toward the higher frequency side such that the carrier sideband frequency ($fs^-$) on the lower frequency side does not reach the uncomfortable audible frequency band fb when the rotational speed co is relatively low. The center frequency fm can be increased by increasing the carrier frequency fc. However, increasing the carrier frequency fc also increases the frequency of the pulse signal PW which is generated through modulation. In the case where the rotational speed ω of the rotary electric machine 80 is low, it is not necessary to generate a pulse signal PW with high resolution using a high carrier frequency fc. However, a pulse signal PW with high resolution is generated using a high carrier frequency fc also in the case where the rotational speed ω of the rotary electric machine 80 is low. Therefore, the switching loss of the inverter 10 may be increased to lower the total electric efficiency of the inverter 10 and the rotary electric machine 80.

Figure 3:
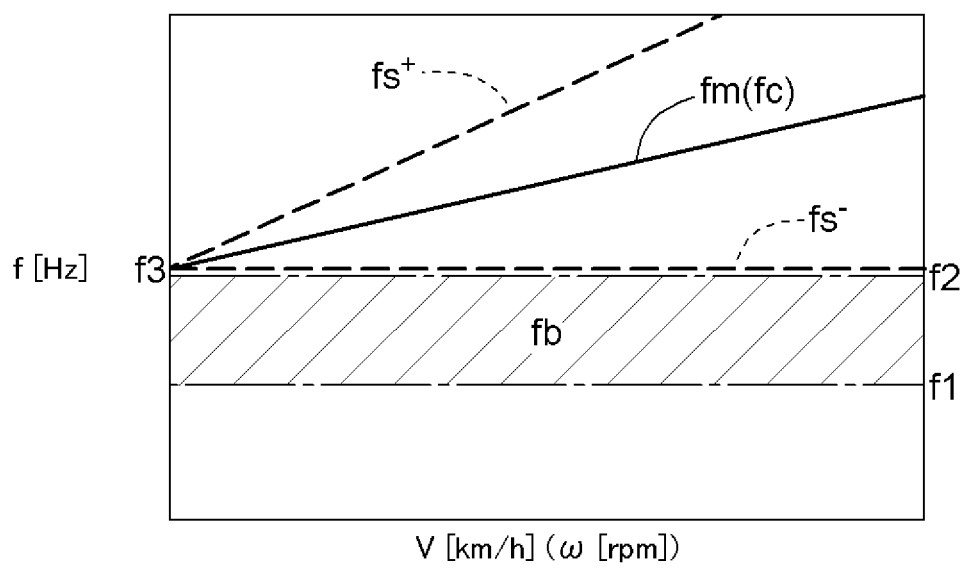
FIG. 3 is a graph illustrating the relationship between noise in the audible range and an uncomfortable audible frequency band for a case where the carrier frequency is varied in accordance with the rotational speed.

Thus, in the present embodiment, the carrier frequency fc is varied in accordance with the rotational speed ω of the rotary electric machine 80 such that the carrier sideband frequencies ($fs^+$, $fs^-$) are not included in a frequency band prescribed in advance (a case where the "uncomfortable audible frequency band fb" is set will be described below by way of example) as indicated in FIG. 3, rather than raising the center frequency fm of noise in the audible range by increasing the carrier frequency fc uniformly irrespective of the rotational speed ω as indicated in FIG. 5. Sounds at frequencies in a so-called audible range that one can actually hear differ among individuals depending on the hearing ability, age, etc. The frequency band (uncomfortable audible frequency band fb) prescribed in advance is a frequency band prescribed generally on the basis of human engineering or the like, for example, rather than a frequency band rendered uncomfortable in accordance with individual preferences. Thus, the frequency band (uncomfortable audible frequency band fb) prescribed in advance is not set in accordance with the preferences of a driver, a passenger, etc., but set in advance as the specifications (parameters) of the rotary electric machine control device 2.

FIG. 3 illustrates an example in which the carrier frequency fc is varied so as to become higher as the rotational speed ω becomes higher such that the lower one (fs⁻) of the carrier sideband frequencies (fs⁺, fs⁻) is not included in the uncomfortable audible frequency band fb in the case where the center frequency fm is higher than the upper-limit frequency f2 of the uncomfortable audible frequency band fb. Although not illustrated, an aspect is not excluded in which the carrier frequency fc is varied so as to become lower as the rotational speed ω becomes higher such that the higher one (fs⁺) of the carrier sideband frequencies (fs⁺, fs⁻) is not included in the uncomfortable audible frequency band fb in the case where the center frequency fm is lower than a lower-limit frequency f1 of the uncomfortable audible frequency band fb.

While FIG. 3 illustrates an example in which the center frequency fm becomes higher in proportion to the rotational speed co, the relationship between the center frequency fm and the rotational speed ω may be non-linear, rather than being linear. The center frequency fm is a frequency that is set in accordance with the carrier frequency fc. Thus, in the case where the relationship between the center frequency fm and the carrier frequency fc is linear, the relationship between the carrier frequency fc and the rotational speed ω is also linear if the relationship between the center frequency fm and the rotational speed ω is linear as indicated in FIG. 3.

By varying the carrier frequency fc in accordance with the rotational speed ω of the rotary electric machine 80 as discussed above, it is possible to reduce noise in the audible range generated in the rotary electric machine 80 in accordance with the carrier frequency fc for pulse width modulation while suppressing a reduction in efficiency of the inverter 10 and the rotary electric machine 80.

In the present embodiment, as indicated in FIG. 3 by way of example, the rotary electric machine control device 2 varies the carrier frequency fc such that the carrier frequency fc becomes higher as the rotational speed ω of the rotary electric machine 80 becomes higher. In many cases, the carrier sideband frequencies (fs⁺, fs⁻) are varied toward the higher frequency side and the lower frequency side away from the center frequency fm which is set in accordance with the carrier frequency fc as the rotational speed ω of the rotary electric machine 80 is raised. In rotary electric machine control, in many cases, the uncomfortable audible frequency band fb is present on the lower frequency side with respect to the center frequency fm which is set in accordance with the carrier frequency fc. Therefore, the carrier sideband frequency (fs⁻) on the lower frequency side may reach the uncomfortable audible frequency band fb when the rotational speed ω of the rotary electric machine 80 is raised.

When the carrier frequency fc is varied such that the carrier frequency fc (center frequency fm) becomes higher as the rotational speed ω of the rotary electric machine 80 becomes higher as indicated in FIG. 3, the carrier sideband frequency (fs⁻) on the lower frequency side can be prevented from reaching the uncomfortable audible frequency band fb even if the rotational speed ω of the rotary electric machine 80 is raised. As a result, generation of an uncomfortable audible sound can be suppressed even if the rotational speed ω of the rotary electric machine 80 is raised. In general, a higher efficiency is achieved when the frequency of the pulse signal PW which is generated through modulation is higher in the case where the rotational speed ω of the rotary electric machine 80 is high, compared to a case where the rotational speed ω is low. The rotary electric machine 80 can be driven efficiently while suppressing noise in the audible range by varying the carrier frequency fc so as to become higher as the rotational speed ω of the rotary electric machine 80 becomes higher.

In the example illustrated in FIG. 3, the rotary electric machine control device 2 varies the carrier frequency fc such that the lower one (fs⁻) of the carrier sideband frequencies (fs⁺, fs⁻) is a frequency "f3" that is higher than the upper-limit frequency f2 of the uncomfortable audible frequency band fb and varied along the upper-limit frequency f2 along with variations in the rotational speed ω of the rotary electric machine 80.

In general, as discussed above, a higher efficiency is achieved when the frequency of the pulse signal PW which is generated through modulation is higher in the case where the rotational speed ω of the rotary electric machine 80 is high, compared to a case where the rotational speed ω is low. However, the loss of the inverter 10 and the rotary electric machine 80 may be increased to lower the efficiency if the frequency of the pulse signal PW is increased by increasing the carrier frequency fc more than necessary. If a focus is placed on reducing noise in the audible range, it is only necessary that the lower one (fs⁻) of the carrier sideband frequencies (fs⁺, fs⁻) should not be lowered to reach the uncomfortable audible frequency band fb. That is, it is only necessary that the lower one (fs⁻) of the frequencies should be kept higher than the upper-limit frequency f2 of the uncomfortable audible frequency band fb irrespective of the rotational speed ω of the rotary electric machine 80. By varying the carrier frequency fc so as to be higher than the upper-limit frequency f2 and along the upper-limit frequency f2 along with variations in the rotational speed ω of the rotary electric machine 80, it is possible to suppress noise in the audible range without lowering the efficiency of the inverter 10 or the rotary electric machine 80 by increasing the carrier frequency fc more than necessary.

In the case where the rotary electric machine 80 is a permanent magnet rotary electric machine in which the rotor 82 includes the permanent magnets 84, the carrier sideband frequencies (fs⁺, fs⁻) are represented by the following formulas, by way of example, in which "fc" is the carrier frequency fc, "ω" is the rotation frequency (rotational speed co) of the rotary electric machine 80, "pp" is the number of pole pairs of the permanent magnets 84 in the rotor 82, and "n" is a natural number.

$$fs^+ = fc + \omega \times pp \times n$$

$$fs^- = fc - \omega \times pp \times n$$

By prescribing the carrier sideband frequencies (fs⁺, fs⁻) using the structure of the rotary electric machine 80, the carrier frequency fc, and the rotational speed ω of the rotary electric machine 80, it is possible to appropriately set the carrier frequency fc which matches the rotational speed ω such that the carrier sideband frequencies (fs⁺, fs⁻) are not included in the uncomfortable audible frequency band fb. Note that "n" represents the order of harmonic waves. In many cases, third harmonic waves are significantly influential. Therefore, in one aspect, "n" is preferably "3". Significantly influential harmonic components can be identified through experiments or simulations. Thus, "n" is not limited to "3", and is preferably set in accordance with the configuration of the rotary electric machine 80, the configuration of the vehicle, the configuration of the rotary electric machine drive device 1 including the inverter 10, etc.

The above formulas are exemplary, and the carrier frequency fc and the rotational speed ω may be associated with each other using a different relational formula. Also in the case where the relationship between the carrier frequency fc and the rotational speed ω is non-linear, rather than being linear, the carrier frequency fc which matches the rotational speed ω can be set appropriately by associating the carrier frequency fc and the rotational speed ω with each other using a table or the like. Such a table can be set through experiments or simulations.

An example in which the carrier frequency fc is varied in accordance with the rotational speed ω of the rotary electric machine 80 has been described above. In the case where the rotary electric machine 80 is a drive force source for a vehicle, however, the rotational speed ω of the rotary electric machine 80 is associated with the rotational speed (travel speed V) of the wheels or the rotational speed of each portion of a power transfer mechanism (not illustrated). In many cases, there is a linear relationship between the rotational speed ω of the rotary electric machine 80 and the rotational speed of the power transfer mechanism such as the travel speed V. Thus, the rotary electric machine control device 2 may vary the carrier frequency fc in accordance with the travel speed V of the vehicle, the rotational speed of the wheels, or the rotational speed of a rotary member in each portion of the power transfer mechanism. The power transfer mechanism is a mechanism that has a rotary member such as a gear, chain, belt, sprocket, and pulley and that is drivably coupled so as to transfer power between the rotary electric machine 80 and the wheels. Examples of the power transfer mechanism include a speed change device and a power distribution device.

Overview of Embodiment

The overview of the rotary electric machine control device (2) described above will be briefly described below.

In one aspect, a rotary electric machine control device (2) that performs drive control on an AC rotary electric machine (80) using an inverter (10) that converts power between DC power and AC power through pulse width modulation based on a carrier frequency (fc) varies the carrier frequency (fc) such that the carrier frequency (fc) becomes higher as a rotational speed (ω) of the rotary electric machine (80) becomes higher so that carrier sideband frequencies (fs$^+$, fs$^-$), which are frequencies of sideband waves that appear on higher and lower sides of a center frequency (fm) that is set in accordance with the carrier frequency (fc), are not included in a frequency band prescribed in advance.

The carrier sideband frequencies (fs$^+$, fs$^-$) are fluctuated in accordance with the rotational speed (ω) of the rotary electric machine (80). Therefore, the carrier sideband frequencies (fs$^+$, fs$^-$) may be included in a frequency band prescribed in advance, e.g. a frequency band for noise in the audible range, depending on the relationship with the rotational speed (ω) of the rotary electric machine (80). However, the carrier sideband frequencies (fs$^+$, fs$^-$) can be determined so as not to be included in such a frequency band by varying the carrier frequency (fc) in accordance with the rotational speed (ω) of the rotary electric machine (80). As a different method, it is also possible to fix the carrier frequency (fc) at a frequency at which the carrier sideband frequencies (fs$^+$, fs$^-$) are not included in such a frequency band over the entire rotational speed range in which the rotary electric machine (80) is used. In this case, however, the switching loss of the inverter (10) may be increased to lower the total electric efficiency of the inverter (10) and the rotary electric machine (80), since a high carrier frequency (fc) is required also in the case where the rotational speed (ω) of the rotary electric machine (80) is low. By varying the carrier frequency (fc) so as to become higher as the rotational speed (ω) of the rotary electric machine (80) becomes higher as in the present configuration, however, it is possible to suppress a reduction in total electric efficiency of the inverter (10) and the rotary electric machine (80). That is, with the present configuration, it is possible to reduce noise in the audible range generated in the rotary electric machine (80) in accordance with the carrier frequency (fc) for pulse width modulation while suppressing a reduction in total electric efficiency of the inverter (10) and the rotary electric machine (80) when controlling the rotary electric machine (80) through pulse width modulation.

In many cases, the frequencies of the sideband waves of noise in the audible range are varied away from the center frequency (fm) along with a rise in the rotational speed (ω) of the rotary electric machine (80). That is, the carrier sideband frequencies (fs$^+$, fs$^-$) are varied toward the higher frequency side and the lower frequency side away from the center frequency (fm) which is set in accordance with the carrier frequency (fc) as the rotational speed (ω) of the rotary electric machine (80) is raised. In rotary electric machine control, in general, the frequency band for noise in the audible range is present on the lower frequency side with respect to the center frequency (fm) which is set in accordance with the carrier frequency (fc). Therefore, the carrier sideband frequency (fs$^-$) on the lower frequency side may reach the frequency band for noise in the audible range when the rotational speed (ω) of the rotary electric machine (80) is raised. When the carrier frequency (fc) is varied such that the carrier frequency (fc) becomes higher as the rotational speed (ω) of the rotary electric machine (80) becomes higher as discussed above, the carrier sideband frequency (fs$^-$) on the lower frequency side can be prevented from reaching the frequency band for such noise in the audible range even if the rotational speed (ω) of the rotary electric machine (80) is raised. As a result, generation of uncomfortable noise in the audible range can be suppressed even if the rotational speed (ω) of the rotary electric machine (80) is raised. In general, a higher efficiency is achieved when the frequency of the pulse signal (PW) which is generated through modulation is higher in the case where the rotational speed (ω) of the rotary electric machine (80) is high, compared to a case where the rotational speed (ω) is low. With the present configuration, the rotary electric machine (80) can be driven efficiently while suppressing noise in the audible range since the carrier frequency (fc) is varied so as to become higher as the rotational speed (ω) of the rotary electric machine (80) becomes higher.

In one aspect, preferably, the carrier sideband frequencies (fs$^+$, fs$^-$) are not lowered along with a rise in the rotational speed (ω) of the rotary electric machine (80).

As discussed above, in rotary electric machine control, in general, the frequency band for noise in the audible range is present on the lower frequency side with respect to the center frequency (fm) which is set in accordance with the carrier frequency (fc). The carrier sideband frequency (fs$^-$)

on the lower frequency side can be prevented from reaching the frequency band for noise in the audible range if the carrier sideband frequencies (fs+, fs−) are not lowered along with a rise in the rotational speed (ω) of the rotary electric machine (80). Thus, generation of uncomfortable noise in the audible range can be suppressed even if the rotational speed (ω) of the rotary electric machine (80) is raised.

In one aspect, preferably, the carrier sideband frequencies (fs+, fs−) are not varied along with a rise in the rotational speed (ω) of the rotary electric machine (80).

As discussed above, in rotary electric machine control, in general, the frequency band for noise in the audible range is present on the lower frequency side with respect to the center frequency (fm) which is set in accordance with the carrier frequency (fc). The carrier sideband frequency (fs−) on the lower frequency side can be prevented from reaching the frequency band for noise in the audible range if the carrier sideband frequencies (fs+, fs−) are not varied along with a rise in the rotational speed (ω) of the rotary electric machine (80). Thus, generation of uncomfortable noise in the audible range can be suppressed even if the rotational speed (ω) of the rotary electric machine (80) is raised.

Preferably, the carrier sideband frequencies (fs+, fs−) at a lower-limit value of the rotational speed (ω) are frequencies that are higher than the frequency band prescribed in advance.

With this configuration, in the case where the carrier frequency (fc) is varied so as to become higher as the rotational speed (ω) of the rotary electric machine (80) becomes higher, the carrier sideband frequency (fs−) on the lower frequency side can be prevented from easily reaching the frequency band for noise in the audible range at each rotational speed (ω). In particular, the carrier sideband frequency (fs−) on the lower frequency side can be prevented from reaching the frequency band for noise in the audible range at each rotational speed (ω) in the case where the carrier sideband frequencies (fs+, fs−) are controlled so as not to be lowered along with a rise in the rotational speed (ω) of the rotary electric machine (80). In addition, the carrier sideband frequency (fs−) on the lower frequency side can be prevented from reaching the frequency band for noise in the audible range at each rotational speed (ω) also in the case where the carrier sideband frequencies (fs+, fs−) are controlled so as not to be varied along with a rise in the rotational speed (ω) of the rotary electric machine (80).

Preferably, the frequency band prescribed in advance is an uncomfortable audible frequency band (fb) prescribed in advance.

If such a frequency band is set, generation of noise in the audible range can be suppressed on the basis of the carrier sideband frequencies (fs+, fs−).

Preferably, when the rotary electric machine control device (2) varies the carrier frequency (fc) such that the carrier frequency (fc) becomes higher as the rotational speed (ω) of the rotary electric machine (80) becomes higher, the carrier frequency (fc) is varied such that a lower one (fs−) of the carrier sideband frequencies (fs+, fs−) is higher than an upper-limit frequency (f2) of the frequency band prescribed in advance and varied along the upper-limit frequency (f2) along with variations in the rotational speed (co) of the rotary electric machine (80).

As discussed above, in general, a higher efficiency is achieved when the frequency of the pulse signal which is generated through modulation is higher in the case where the rotational speed (ω) of the rotary electric machine (80) is high, compared to a case where the rotational speed (ω) is low. However, the loss of the inverter (10) and the rotary electric machine (80) may be increased to lower the efficiency if the frequency of the pulse signal (PW) is increased by increasing the carrier frequency (fc) more than necessary. If a focus is placed on reducing noise in the audible range, it is only necessary that the lower one (fs−) of the carrier sideband frequencies (fs+, fs−) should not be lowered to reach the frequency band prescribed in advance. That is, it is only necessary that the lower one (−fc) of the frequencies should be kept at a certain level higher than the upper-limit frequency (f2) of the frequency band prescribed in advance irrespective of the rotational speed (ω) of the rotary electric machine (80). With the present configuration, the carrier frequency (fc) is varied such that the lower one (−fc) of the frequencies is higher than the upper-limit frequency (f2) of the frequency band prescribed in advance and varied along the upper-limit frequency (f2) along with variations in the rotational speed (ω) of the rotary electric machine (80). Consequently, noise in the audible range can be suppressed without lowering the total electric efficiency of the inverter (10) or the rotary electric machine (80) by increasing the carrier frequency (fc) more than necessary.

In one aspect, preferably, in the case where the rotary electric machine (80) is a permanent magnet rotary electric machine in which a rotor (82) includes permanent magnets (84), the carrier sideband frequencies (fs+, fs−) are represented as $$fc \pm \omega \times pp \times n$$

where fc is the carrier frequency (fc), ω is a rotation frequency of the rotary electric machine (80), pp is a number of pole pairs of the permanent magnets (84) in the rotor (82), and n is a natural number.

By prescribing the carrier sideband frequencies (fs+, fs−) using the structure of the rotary electric machine (80), the carrier frequency (fc), and the rotational speed (ω) of the rotary electric machine (80), the carrier frequency (fc) which matches the rotational speed (ω) can be set appropriately such that the carrier sideband frequencies (fs+, fs−) are not included in the uncomfortable audible frequency band (fb).

The invention claimed is:

1. A rotary electric machine control device that performs drive control on an AC rotary electric machine using an inverter that converts power between DC power and AC power through pulse width modulation based on a carrier frequency, the rotary electric machine control device comprising:
an electronic control unit that is configured to vary the carrier frequency such that the carrier frequency becomes higher as a rotational speed of the rotary electric machine becomes higher so that carrier sideband frequencies, which are frequencies of sideband waves that appear on higher and lower sides of a center frequency that is set in accordance with the carrier frequency, are not included in a frequency band prescribed in advance.

2. The rotary electric machine control device according to claim 1, wherein the carrier sideband frequencies are not lowered along with a rise in the rotational speed of the rotary electric machine.

3. The rotary electric machine control device according to claim 2, wherein the carrier sideband frequencies are not varied along with a rise in the rotational speed of the rotary electric machine.

4. The rotary electric machine control device according to claim 3, wherein the carrier sideband frequencies at a lower-limit value of the rotational speed are frequencies that are higher than the frequency band prescribed in advance.

5. The rotary electric machine control device according to claim 4 any one of claims 1 to 4, wherein the frequency band prescribed in advance is an uncomfortable audible frequency band prescribed in advance.

6. The rotary electric machine control device according to claim 5, wherein
the carrier frequency is varied such that a lower one of the carrier sideband frequencies is higher than an upper-limit frequency of the frequency band prescribed in advance and varied along the upper-limit frequency along with variations in the rotational speed of the rotary electric machine.

7. The rotary electric machine control device according to claim 6, wherein:
the rotary electric machine is a permanent magnet rotary electric machine in which a rotor includes permanent magnets; and
the carrier sideband frequencies are represented as $$fc \pm \omega \times pp \times n$$

where fc is the carrier frequency, $\omega$ is a rotation frequency of the rotary electric machine, pp is a number of pole pairs of the permanent magnets in the rotor, and n is a natural number.

8. The rotary electric machine control device according to claim 1, wherein
the carrier sideband frequencies are not varied along with a rise in the rotational speed of the rotary electric machine.

9. The rotary electric machine control device according to claim 1, wherein
the carrier sideband frequencies at a lower-limit value of the rotational speed are frequencies that are higher than the frequency band prescribed in advance.

10. The rotary electric machine control device according to claim 1, wherein
the frequency band prescribed in advance is an uncomfortable audible frequency band prescribed in advance.

11. The rotary electric machine control device according to claim 1, wherein
the carrier frequency is varied such that a lower one of the carrier sideband frequencies is higher than an upper-limit frequency of the frequency band prescribed in advance and varied along the upper-limit frequency along with variations in the rotational speed of the rotary electric machine.

12. The rotary electric machine control device according to claim 1, wherein:
the rotary electric machine is a permanent magnet rotary electric machine in which a rotor includes permanent magnets; and
the carrier sideband frequencies are represented as $$fc \pm \omega \times pp \times n$$

where fc is the carrier frequency, $\omega$ is a rotation frequency of the rotary electric machine, pp is a number of pole pairs of the permanent magnets in the rotor, and n is a natural number.

13. The rotary electric machine control device according to claim 2, wherein
the carrier sideband frequencies at a lower-limit value of the rotational speed are frequencies that are higher than the frequency band prescribed in advance.

14. The rotary electric machine control device according to claim 2, wherein
the frequency band prescribed in advance is an uncomfortable audible frequency band prescribed in advance.

15. The rotary electric machine control device according to claim 2, wherein
the carrier frequency is varied such that a lower one of the carrier sideband frequencies is higher than an upper-limit frequency of the frequency band prescribed in advance and varied along the upper-limit frequency along with variations in the rotational speed of the rotary electric machine.

16. The rotary electric machine control device according to claim 2, wherein:
the rotary electric machine is a permanent magnet rotary electric machine in which a rotor includes permanent magnets; and
the carrier sideband frequencies are represented as $$fc \pm \omega \times pp \times n$$

where fc is the carrier frequency, $\omega$ is a rotation frequency of the rotary electric machine, pp is a number of pole pairs of the permanent magnets in the rotor, and n is a natural number.

17. The rotary electric machine control device according to claim 8, wherein
the carrier sideband frequencies at a lower-limit value of the rotational speed are frequencies that are higher than the frequency band prescribed in advance.

18. The rotary electric machine control device according to claim 8, wherein
the frequency band prescribed in advance is an uncomfortable audible frequency band prescribed in advance.

19. The rotary electric machine control device according to claim 8, wherein
the carrier frequency is varied such that a lower one of the carrier sideband frequencies is higher than an upper-limit frequency of the frequency band prescribed in advance and varied along the upper-limit frequency along with variations in the rotational speed of the rotary electric machine.

20. The rotary electric machine control device according to claim 8, wherein:
the rotary electric machine is a permanent magnet rotary electric machine in which a rotor includes permanent magnets; and
the carrier sideband frequencies are represented as $$fc \pm \omega \times pp \times n$$

where fc is the carrier frequency, $\omega$ is a rotation frequency of the rotary electric machine, pp is a number of pole pairs of the permanent magnets in the rotor, and n is a natural number.

* * * * *